Nov. 14, 1933.  W. GOETZELMAN  1,935,565
TEMPORARY COVER FOR SWITCH BOXES
Filed July 25, 1932
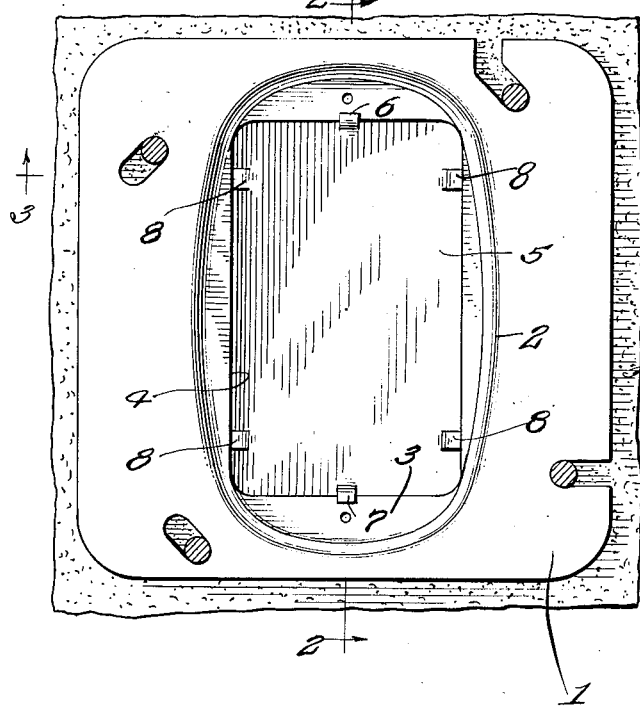
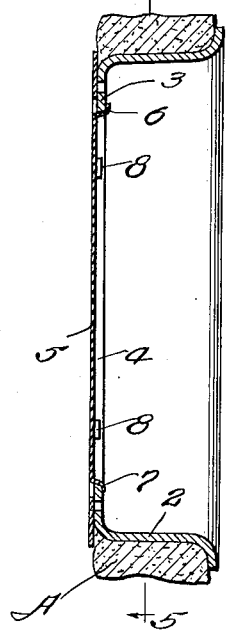
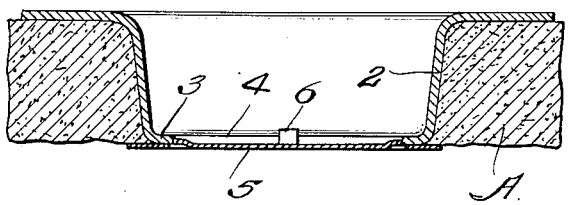
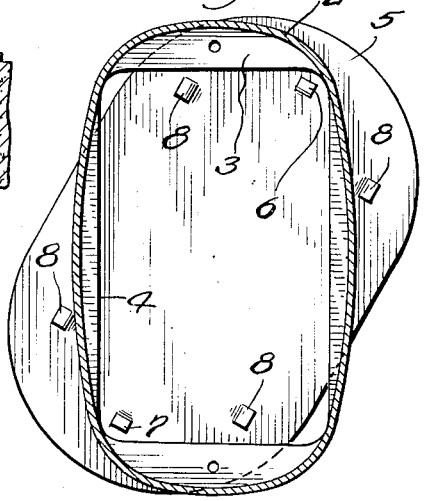
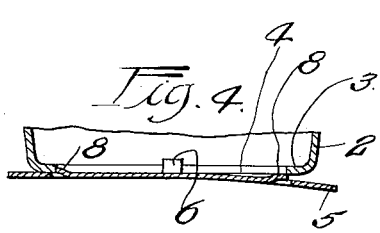
Inventor:
William Goetzelman
By W. F. Freudenreich
Attorney.

Patented Nov. 14, 1933

1,935,565

UNITED STATES PATENT OFFICE 1,935,565

TEMPORARY COVER FOR SWITCH BOXES

William Goetzelman, Chicago, Ill., assignor to Appleton Electric Company, a corporation of Illinois Application July 25, 1932. Serial No. 624,382

5 Claims. (Cl. 247—15)

In the erection of houses and other buildings that are internally plastered it is customary to place in position all of the conduits, outlet boxes and switch boxes for the electric wiring before the walls are plastered. The various lighting and switch fixtures are not, however, applied until after the plastering has been done, so that some of the boxes are left open, allowing plaster to enter the same during the plastering process.

The object of the present invention is to produce a simple and novel means for temporarily closing switch boxes and outlet boxes in such a manner that they will be sealed against the entrance of plaster and may easily be opened after the plastering has been done.

In carrying out my invention, I make a cover from a thin metal plate, preferably a resilient piece of steel; striking up from one side of the plate a pair of hooks that are spaced apart a distance equal to one of the shorter transverse dimensions of the opening to be covered whereby, when the cover plate is laid across the opening with the line of the hooks along one of the longer transverse dimensions of the opening and the plate is then turned, the hooks will interlock the cover plate with the wall containing the opening. In order to guard against accidental displacement of the cover by a turning movement in a direction to release the hooks from the wall, I strike up a plurality of lugs on the same side of the cover plate as the hooks and so spaced that they will engage with the wall edges bounding the opening when the hooks are in locking positions and prevent the cover plate from being turned. However, the resiliency of the cover plate permits it to be sprung or bowed far enough to raise out of the opening a sufficient number of the lugs to permit the cover plate to be turned. Therefore, in applying the temporary cover, it is simply laid over the opening with a slight pressure applied to the area over the hooks to cause the hooks to project through the hole and the cover plate is then turned until the hooks interlock with the wall. In the meantime the lugs ride on the outer face of the wall but snap down into the opening as soon as the lugs are brought into registration with the marginal portions of the opening.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a rear view of the front wall of an outlet box or switch box having one of my temporary covers applied thereto, showing a fragment of the plastering adjacent to the box; Fig. 2 is a section on line 2—2 of Fig. 1; Fig. 3 is a section on line 3—3 of Fig. 1; Fig. 4 is a view similar to Fig. 3, showing only a fragment of the front wall of the box and the temporary cover, the cover having been sprung preparatory to turning it in the act of removing the same; and Fig. 5 is a section taken on line 5—5 of Fig. 2, showing only the box and the temporary cover, with the cover laid on the box as the first step in applying it.

Referring to the drawing, 1 represents a wall which, in the arrangement shown, is the detachable front wall of an outlet box or switch box. The central portion of the member 1 is pressed forwardly for a distance equal to the thickness of the plaster A to be subsequently applied to the wall of a building in which the box is mounted, as indicated at 2. The greater portion of what may be regarded as the bottom 3 of the pan-shaped member is cut away to provide a large opening 4 which heretofore has been left open until after the walls in which boxes of this kind are placed have been plastered. The opening 4 is shown as being rectangular in cross section although it will be evident that my invention is applicable to openings of any shape other than circular.

In order temporarily to cover the opening 4 so that plaster will not enter the box while the walls are being plastered, I provide a detachable cover in the form of a thin plate 5 which may be flexed or bowed and is therefore preferably made of resilient metal. The cover plate is made somewhat larger than the opening in the wall 3 and, for application to the type of box wall illustrated, is preferably made longer and wider than the wall 3 so as to project beyond the side walls of the pan-shaped part 2. The metal of the cover plate is punched out so as to form two little tongues 6 and 7 projecting from the same side or face thereof; these tongues being bent into the form of hooks. These hooks are spaced apart a distance equal to the length of the opening measured along the major axis or, in other words, the hooks are spaced apart a distance considerably shorter than one of the diagonals of the opening. Therefore the cover plate may be laid on the wall 3 with the line connecting the hooks 6 and 7 registering with one of the diagonals of the opening, as shown in Fig. 5, whereupon the hooks extend freely through the opening and will interlock with the wall 3, as shown in Fig. 2, when the cover plate is turned through an angle of about 30° or into the position shown in Fig. 1. It is not necessary to depend entirely upon the frictional grip of the hooks to hold the cover against being turned into a release position, as I strike up from the same side of the cover plate as that on which the hooks are located a plurality of ears or lugs 8 so placed that, when the hooks are in their locking positions with respect to the wall of the box, these lugs lie within the opening in contact with the edges of the wall at the long sides of the opening, as best shown in Figs. 1 and 3. In the arrangement shown, there are four of these ears or lugs, two on each side, whereas the hooks may be said to be placed at the ends. It will be seen that, when the cover plate is laid on the box, as shown in Fig. 5, two of the ears or lugs lie within the opening while the other two not only lie above or outwardly from the wall 3 but, actually, laterally beyond the side walls of the pan-shaped element 2. In turning the cover plate to its final position, as illustrated in Fig. 1, the plate will be flexed or bowed so as to permit the two outside lugs to ride across the outer face of the wall 3. Just as the cover plate reaches its final position, the two lugs that were already in the opening 4 strike against the long edges bounding the opening and the other two lugs will snap down into the opening beside these same edges. In other words, when the cover plate reaches its final position, all four of the ears or lugs 8 will lie within the opening with their ends in the plane of the wall 3 and will thus prevent the cover plate from being turned in either direction. However, by taking hold of the plate at about the middle, it may be bowed or flexed outwardly away from the wall 3, as shown in Fig. 4, lifting the lugs at one side of the opening above or outwardly from the wall 3 and thus permitting the cover to be turned in its own plane until the parts again assume the position shown in Fig. 5, whereupon the cover plate may be lifted off.

It will be seen that it is but the work of a moment to apply one of the cover plates and that, until the cover plate is again deliberately manipulated in a manner to release it, it will remain in place on the box. Because the cover plate is thin it does not project materially beyond the plane of the front face of the box and therefore does not form an obstruction in the way of the plasterers' tools while a wall in which the box is mounted is being plastered. Furthermore, after plastering has been completed, the cover plate may be detached by a quick, simple manipulation of the cover plate, and it is then ready for use in another location.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, a wall having a non-circular opening therethrough, a cover for said opening adapted to rest against one face of said wall and having hooks projecting from one side thereof in positions to span said opening at one of its shorter dimensions and engage with the other face of the wall to hold the cover in place, the cover being removable by turning it to bring the hooks in line with one of the longer dimensions of said opening, and lugs on the cover on the same side as the hooks in positions to abut against the edges of the wall beside said opening and prevent turning of the cover, said cover being of such a character that it may be flexed or bowed to permit the said lugs to be raised out of said opening while the hooks remain interlocked with the wall.

2. In combination, a wall having a non-circular opening therethrough, a cover for said opening adapted to rest against one face of said wall and having hooks projecting from one side thereof in positions to span said opening at one of its shorter dimensions and engage with the other face of the wall to hold the cover in place, the cover being removable by turning it to bring the hooks in line with one of the longer dimensions of said opening, and lugs on the cover on the same side as the hooks in positions to abut against the edges of the wall beside said opening and prevent turning of the cover, said cover being of resilient sheet metal capable of being flexed or bowed to lift the said lugs out of said opening while the cover remains locked to the wall.

3. In combination, a wall of a switch box or the like having a polygonal opening therein, a flexible sheet metal cover for said opening having hooks projecting from one side in positions such as to permit them to interlock with the wall at the ends of one of the shorter dimensions of the said opening where the hooks are inserted in the opening and the cover is turned in its plane, and lugs on the cover on the same side as the hooks in positions to abut against the edges of the wall beside said opening where the hooks are interlocked with said wall and prevent the cover from turning until the cover is flexed or bowed outwardly far enough to lift the lugs out of the opening.

4. In combination, a wall for a switch box or the like having a four-sided opening, a flexible sheet metal cover for said opening having two hooks projecting from a face thereof to interlock with the wall where inserted through the opening and brought along the line of one of the shorter distances between two opposed sides of the opening, lugs on the same side of the plate as the hooks adapted to snap into the opening and engage with the edges of the wall at the other two sides of the opening where the hooks are interlocked as aforesaid and thereby prevent the cover from being turned to release the hooks until the cover is flexed to raise the lugs out of the opening.

5. In combination, a wall for a switch box or the like having a four-sided opening, and a flexible sheet metal cover for the opening having hooks struck up from one side thereof at a distance apart corresponding to the length of one of the axes of said opening and having on the same side as the hooks a pair of lugs positioned so as to be disposed at the ends of the other axis of the opening when the hooks are at the ends of the first-mentioned axis, whereby the cover may be attached to the wall by inserting the hooks in said opening and turning the cover until the hooks interlock with the wall and the lugs snap into the opening.

WILLIAM GOETZELMAN.